(12) United States Patent
Park et al.

(10) Patent No.: US 8,723,362 B2
(45) Date of Patent: May 13, 2014

(54) DIRECT TIE-IN OF A BACKUP POWER SOURCE TO MOTHERBOARDS IN A SERVER SYSTEM

(75) Inventors: Seung Hoon Park, Fremont, CA (US); Amir Meir Michael, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 291 days.

(21) Appl. No.: 12/509,349

(22) Filed: Jul. 24, 2009

(65) Prior Publication Data

US 2011/0018342 A1 Jan. 27, 2011

(51) Int. Cl.
*H02J 7/00* (2006.01)

(52) U.S. Cl.
USPC ............... 307/66; 307/64; 713/300; 713/330

(58) Field of Classification Search
CPC .......... H02J 9/062; G06F 1/3203; G06F 1/26
USPC ......................... 307/64, 43, 66; 713/300, 330
See application file for complete search history.

(56) References Cited

U.S. PATENT DOCUMENTS

| | | | | |
|---|---|---|---|---|
| 5,432,386 A * | 7/1995 | Cerra et al. | ...................... | 307/66 |
| 5,477,091 A | 12/1995 | Fiorina et al. | | |
| 6,198,642 B1 * | 3/2001 | Kociecki | ......................... | 363/37 |
| 6,317,012 B1 * | 11/2001 | Coffey | ....................... | 333/24 R |
| 6,509,657 B1 * | 1/2003 | Wong et al. | ..................... | 307/66 |
| 6,917,125 B2 * | 7/2005 | Yim | ................. | 307/66 |
| 7,462,954 B2 | 12/2008 | Kraus | | |
| 7,589,436 B2 * | 9/2009 | Takahashi et al. | .............. | 307/66 |
| 7,653,827 B2 * | 1/2010 | Dobbs et al. | .................. | 713/340 |
| 7,870,379 B2 * | 1/2011 | Krieger et al. | ................ | 713/100 |
| 7,886,173 B2 * | 2/2011 | Krieger et al. | ................ | 713/330 |
| 7,992,027 B2 * | 8/2011 | Suzuki et al. | ................ | 713/330 |
| 2002/0191471 A1 * | 12/2002 | Caulkins | ....................... | 365/226 |
| 2005/0099750 A1 | 5/2005 | Takahashi et al. | | |
| 2005/0121979 A1 * | 6/2005 | Matsumoto et al. | ............ | 307/66 |
| 2005/0240814 A1 * | 10/2005 | Sasakura et al. | ................ | 714/14 |
| 2006/0149979 A1 * | 7/2006 | Sakakibara et al. | .......... | 713/300 |

(Continued)

FOREIGN PATENT DOCUMENTS

CN 2935596 Y 8/2007

OTHER PUBLICATIONS

PCT International Search Report and Written Opinion, PCT Application No. PCT/US2010/038516, Oct. 15, 2010, six pages.

(Continued)

*Primary Examiner* — Jared Fureman
*Assistant Examiner* — Alfonso Perez Borroto
(74) *Attorney, Agent, or Firm* — Fenwick & West LLP

(57) ABSTRACT

The need for an uninterrupted power supply (UPS) in a data center is obviated by tying a DC voltage from a backup power source directly to the motherboards of multiple servers in the data center. AC power received from a power utility service is converted into a lower voltage by a site transformer and then provided to one or more power distribution units at a site. The power distribution units supply power to a plurality of servers, which include power supplies that convert the AC electrical power to DC electrical power for use by the servers' motherboards. In the event of a failure of power from the utility service, the backup power source provides DC electrical power to the motherboards, e.g., for sufficient time to start up a generator to provide power in place of the utility service.

34 Claims, 3 Drawing Sheets

(56) References Cited

U.S. PATENT DOCUMENTS

| | | | |
|---|---|---|---|
| 2007/0255968 A1* | 11/2007 | Suzuki et al. | 713/300 |
| 2007/0278860 A1* | 12/2007 | Krieger et al. | 307/64 |
| 2009/0021078 A1 | 1/2009 | Corhodzic et al. | |
| 2009/0164825 A1 | 6/2009 | Sartain | |
| 2009/0189774 A1* | 7/2009 | Brundridge et al. | 340/654 |
| 2009/0267418 A1* | 10/2009 | Lin et al. | 307/66 |
| 2010/0102633 A1* | 4/2010 | Seaton | 307/64 |

OTHER PUBLICATIONS

United States Patent and Trademark Office, Non-final Office Action, U.S. Appl. No. 12/838,320, Jul. 19, 2012, 10 pages.

Australian Government, IP Australia, Patent Examination Report No. 1, Patent Application No. 2010274972, May 9, 2013, two pages.

State Intellectual Property Office of the People's Republic of China, First Office Action, Chinese Patent Application No. 201080033507.7, Oct. 8, 2013, twenty-nine pages.

* cited by examiner

DIRECT TIE-IN OF A BACKUP POWER SOURCE TO MOTHERBOARDS IN A SERVER SYSTEM

BACKGROUND

This invention relates generally to power electronics, and more particularly to providing backup power for multiple servers in a data center and/or to other critical electrical equipment.

Organizations often employ data centers to manage their data processing and other computing needs. A data center typically houses many racks of servers, which together perform the processing tasks that a single machine could not. The role of a data center is often critical to an organization, and downtime of a data center can result in severe consequences to the organization and to others who may rely on the data center. Since power failures are not uncommon, data centers use power backup systems to deal with interruptions in the supply of power from utility services that would otherwise result in downtime.

One power backup system designed to provide emergency power to computing resources is called an uninterrupted power supply (UPS). In a typically data center deployment, a UPS is placed between the input power terminal from a utility service and one or more power distribution units in the data center, to which the servers are connected. When the utility power is functioning properly, the UPS uses a portion of the utility power to charge a battery within the UPS, using an internal rectifier to convert the AC power from the utility service into DC power for charging the battery. The majority of the remaining power from the utility service is passed along for use by the site. If an interruption in the utility power occurs, the UPS provides temporary backup power to the site by using an inverter to convert the DC power stored in its battery into AC power. This temporary power is available for a short period of time, allowing an auxiliary power supply (such as a generator) to be turned on or allowing the equipment to be shut down safely, thereby avoiding catastrophic loss.

Because the power conversions performed by the rectifiers and inverters in the UPS are relatively inefficient, the UPS process can result in a power loss of up to 10-12%. For large data centers, this inefficiency can be very significant. Not only is this a waste of electrical power and the costs associated therewith, it also produces heat at the UPS and thus requires additional electrical power to remove the additional heat using an air conditioning system. It would be desirable, therefore, to eliminate the need for the UPS system altogether, while still providing backup power to critical electrical equipment.

One alternative to a UPS is to place a backup battery on each motherboard in a data center. Although the backup batteries can supply power in the event of a utility power failure, this design suffers from a number of drawbacks. For example, locating the batteries on the motherboard increases the cooling requirements for the server, since the batteries must be kept away from higher temperatures. The design also requires a large number of batteries, one for each server motherboard, which increases the maintenance costs and as well as the monitoring requirements to ensure that the backup power system is reliable. Finally, given the large number of batteries, failure of at least some of the batteries is more likely, but this design provides no redundancy in the case of battery failure.

SUMMARY

Embodiments of the invention obviate the need for an uninterrupted power supply (UPS) by tying a DC voltage directly to the motherboards of multiple servers. In one embodiment, a site includes one or more power distribution units that are coupled to receive AC electrical power, e.g., from a site transformer coupled to receive electrical power from a utility service. The site includes a plurality of servers, which include a motherboard and a power supply for converting the AC electrical power from the power distribution units to DC electrical power for consumption by electrical components on the motherboard. The system also includes a backup power source for providing DC electrical power to a plurality of the motherboards. In the event of a failure of power from the utility service, the backup power source provides power for a period of time, allowing for example an auxiliary power source to be turned on.

In one embodiment, the backup power source comprises a set of batteries, which may be thermally isolated from the servers, for example, by locating the batteries away from the servers. In another embodiment, the backup power source supplies a DC voltage that is higher than the voltage required by the servers, and the servers include a DC/DC regulator circuit for converting the DC voltage to a lower voltage to be used by the servers. The higher voltage enables a lower current in the conductor between the backup power source and the servers, which results in less power loss in the conductor and/or a smaller conductor required for power transmission. In another embodiment, the backup power source is centrally monitored and controlled, and thus more conveniently maintained, using control circuits at the servers.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
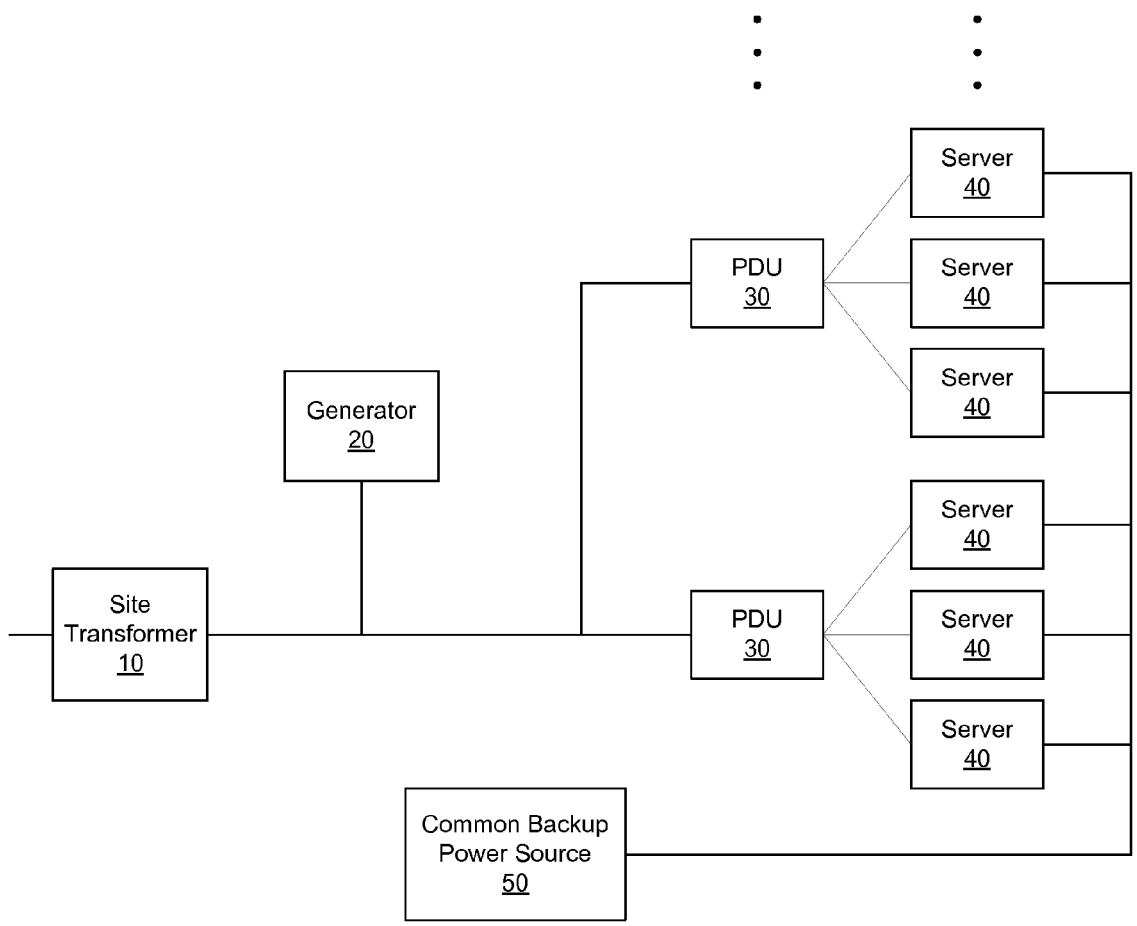
FIG. 1 is a schematic drawing of a server system having a backup power source for a plurality of servers, in accordance with an embodiment of the invention.

FIG. 1 illustrates an example electrical system for providing power to a number of servers 40 located at a site, such as a data center. As used herein, a server 40 (or server computer) is any hardware device that is designed to provide computing services to clients, usually in conjunction with appropriate software installed on the server. Therefore, the techniques disclosed herein may be used to provide power to any kind of hardware devices that rely on electrical power from a power utility service and are thus subject to the dangers of occasional power outages.

A utility service often transports and delivers AC power at a higher voltage than that used at a customer premises. As a result, as shown in FIG. 1, a site transformer 10 receives AC power from the utility service and steps the voltage down for use at the site. The site transformer is coupled to a number of power distribution units 30, which distribute the electrical power throughout the site. In a typical industrial deployment, such as in a data centers, power distribution units 30 reduce high voltage and current to levels from the utility service down to more commonly used levels (e.g., from 480 VAC to multiple plugs of 208 VAC and/or 120 VAC). Electronics at the site are plugged into (or otherwise electrically coupled) to the power distribution units 30 to receive the AC electrical power. In the data center example illustrated, multiple servers 40 are plugged into one or more power distribution units 30.

Since the power provided by the utility service may suffer from occasional interruptions, the system shown in FIG. 1 includes a backup power system. Instead of using a UPS, the system includes a generator 20 and a mechanism for directly tying DC power to the servers from a backup power source 50. Upon failure of the electrical power from the utility service, the generator 20 is activated. However, a backup generator 20 requires some startup time before it can supply AC electrical power to the system. Therefore, while the generator 20 is starting up, the backup power source 50 provides DC electrical power directly to the servers 40.

Figure 2:
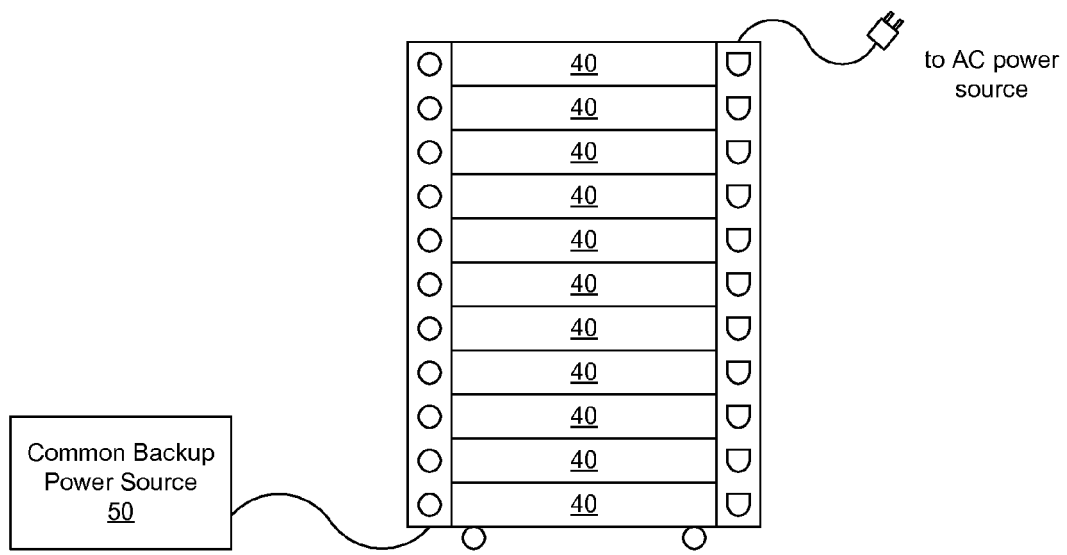
FIG. 2 is a schematic drawing of a rack-mounted server system, in accordance with an embodiment of the invention.

In one embodiment, the servers 40 are deployed in a rack-mounted system, where each of a plurality of racks contains a plurality of servers 40. FIG. 2 illustrates an example of a set of rack-mounted servers. The rack provides a mechanical interface for the servers 40, which are fixed in place by the rack. The rack also provides an electrical interface for the servers, including power lines and communication buses. In one embodiment, the rack includes a plug that is connected to an AC power source, such as a power distribution unit 30 at the site. The plug is coupled to a conductor that runs along the rack, making electrical contact with each installed server and thereby providing AC electrical power to each of the servers.

The rack also includes an electrical conductor for providing DC electrical power from the backup power source 50. As shown in FIG. 2, the backup power source 50 is coupled to one rack of servers 40. However, it is understood that the backup power source 50 may be connected to any number of racks, and multiple backup power sources 50 may be coupled to the same rack.

Figure 3:
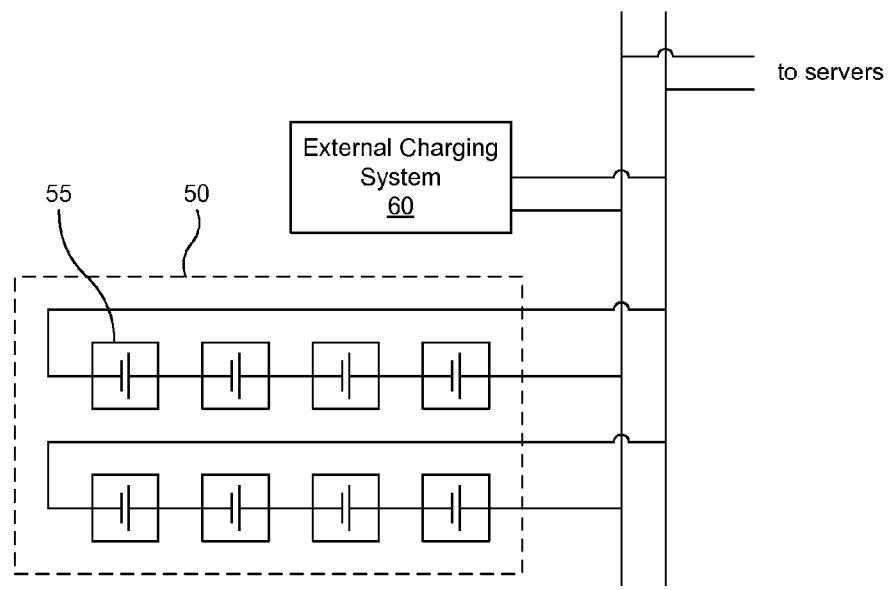
FIG. 3 is a schematic drawing of a backup power source, in accordance with an embodiment of the invention.

In one embodiment, the backup power source 50 comprises one or more batteries. FIG. 3 illustrates an embodiment of the backup power source 50 that comprises a plurality of batteries 55. In this example, the backup power source 50 includes two sets of four batteries 55 coupled in series, and the two sets coupled in parallel. The parallel batteries 55 provide a backup in case of failure of one of the batteries 55 in the backup power source 50. For example, if a battery in one string fails, the backup power source 50 may still provide DC electrical power from the other string. Even without a failure, the two parallel strings of batteries 55 beneficially provide additional energy storage so that the backup power source 50 can operate longer before its batteries 55 run out of power. Other embodiments may include different numbers and arrangements of batteries 55 in the backup power source 50.

In one embodiment, the backup power source 50 is configured to provide a higher DC voltage than the voltage used by the servers 40. Typical computer hardware uses one or more DC voltages, such as 12 VDC, 5 VDC, and/or 3.3 VDC. If the batteries 55 of the backup power source 50 are 12 VDC (such as a standard car battery), then the four batteries 55 in series results in an output voltage of 48 VDC from the backup power source 50. In one embodiment, this higher voltage is transmitted in a conductor to the servers and then stepped down at each of the servers to the appropriate voltage levels required by the servers. The higher voltage enables a lower current in the conductor between the backup power source and the servers, which results in less power loss in the conductor and/or a smaller conductor required for power transmission.

Figure 4:
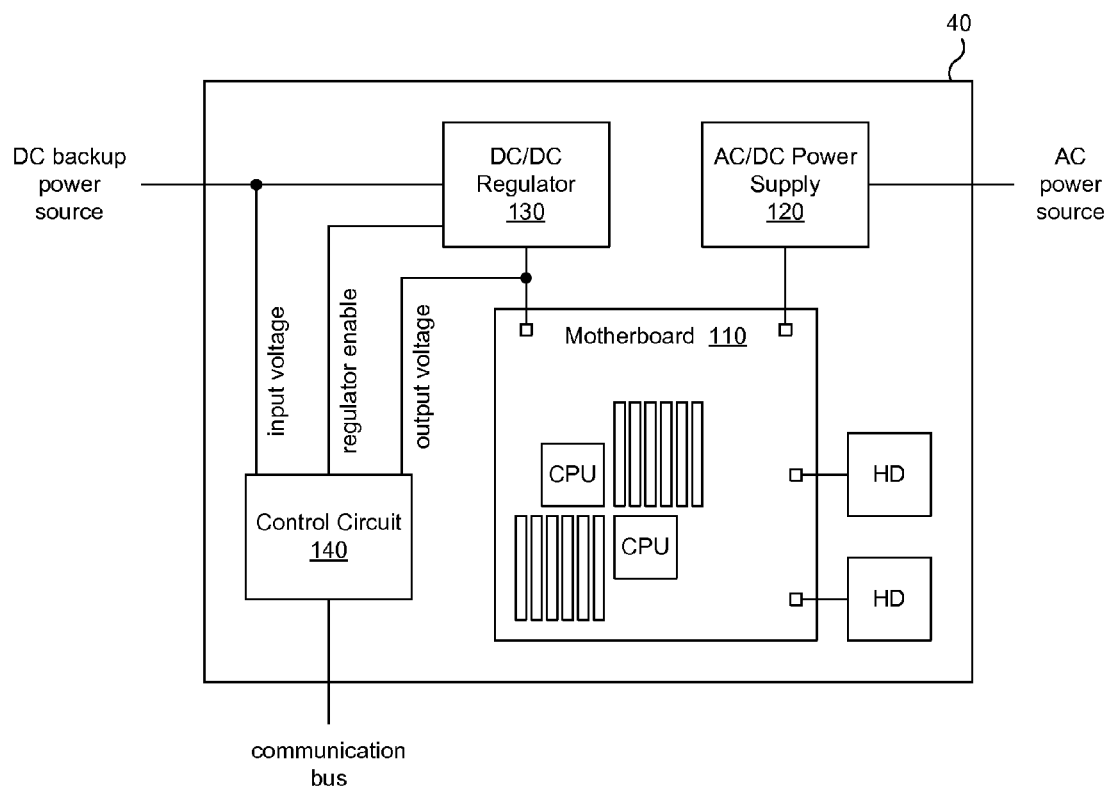
FIG. 4 is a schematic drawing of a server, in accordance with an embodiment of the invention.

FIG. 4 illustrates one embodiment of a server 40, which typically includes at least one motherboard 110 and an AC/DC power supply 120. The motherboard 110 may include standard electrical components, such as CPUs, memory, and other circuitry, and the motherboard may be connected to other auxiliary devices, such as hard drives and other peripherals. The AC/DC power supply 120 is coupled to the input AC power source and is configured to convert the AC electrical power into DC electrical power. The AC/DC power supply 120 may produce one or more different DC voltages as required by the motherboard 110.

To provide a backup power source for the motherboard 110, a conductor from the backup power source 50 is also coupled to the motherboard 110. FIG. 4 illustrates an embodiment of the invention in which the backup power source 50 provides a voltage that is above the voltage used by the motherboard 110. In this embodiment, a DC/DC regulator 130 converts the higher DC voltage into one or more lower voltages for use by the motherboard 110. In an embodiment in which the backup power source 50 provides the same power needed by the motherboard 110, the backup power source 50 may be connected directly to the motherboard 110 without the use of the DC/DC regulator 130. Although the DC/DC regulator 130 is shown as a separate component, this functionality may be incorporated into circuitry on the motherboard 110, it may be incorporated into the AC/DC power supply 120, or it may be provided by a device outside of the server 40. Moreover, one DC/DC regulator 130 may server multiple motherboards 110 and/or multiple servers 40.

The server 40 further comprises a control circuit 140, which may perform a number of useful functions. In one example, the control circuit 140 is coupled to measure the input voltage from the backup power source 50 to the DC/DC regulator 130. This allows the control circuit to determine if the voltage of the backup power source 50 is too low, which may occur if the charge in the batteries 55 in the backup power source 50 is low. The control circuit 140 may also be coupled to measure the output voltage from the DC/DC regulator 130 into the motherboard 110. Since this input voltage to the motherboard 110 is also connected to the output of the power supply 120, this output voltage line also allows the control circuit to measure the output voltage of the power supply 120. In another embodiment, the control circuit 140 includes a control line to the DC/DC regulator 130 for sending a 'regulator enable' signal, which allows the control circuit to turn on or off the DC/DC regulator 130. In an off mode, the DC/DC regulator 130 may prevent power from being transferred through it, either from the backup power source 50 to the motherboard 110, or from the motherboard to the backup power source 50.

In one embodiment, while the utility power is working under normal conditions, the control circuit 140 disconnects the backup power source 50 from the motherboard 110 by disabling the DC/DC regulator 130. Beneficially, this may prevent backflow of current from the main power supply 120 into the backup power source 50. While the DC/DC regulator 130 is disabled, the output voltage signal measures the output voltage of the power supply 120. Therefore, the control circuit 140 may detect a failure of electrical power from the power supply 120 based on the output voltage signal (e.g., when the output voltage drops below a predetermined threshold). Alternatively, the control circuit 140 may have a separate line for measuring the voltage of the power supply 120. When a failure is detected, the control circuit 140 enables the DC/DC regulator 130, which begins to provide DC electrical power from the backup power source 50. When the control circuit 140 determines that the power supply 120 is again producing a sufficient voltage (e.g., because the generator 20 has started or the utility service is back on), the control circuit 140 may disable the DC/DC regulator 130.

In one embodiment, the control circuit 140 disconnects the motherboard 110 from the backup power source 50 when the measured voltage of the backup power source 50 is low. This prevents the backup power source 50 from being used when it does not have a sufficient charge. In another embodiment, when the control circuit 140 detects that the voltage of the backup power source 50 is low, the control circuit 140 causes an injection of current to recharge the batteries 55 in the backup power source 50.

The current for recharging the batteries 55 may come from various sources in different embodiments. For example, the backup power source 50 may be coupled to the AC/DC power supply 120 so that, when the AC power source is operating, a portion of the current provided by the AC/DC power supply 120 is diverted to the backup power source 50 and used to recharge the batteries 55 therein. The control circuit 140 may be configured to provide the path from the AC/DC power supply 120 to the backup power source 50 when recharging is to be performed. In another embodiment, an external charging system 60 is used to recharge the batteries 55, as illustrated in FIG. 3. In this embodiment, responsive to determining that the voltage of the backup power source 50 is low, the external charging system 60 is activated to provide current over the power line to recharge the batteries 55 in the backup power source 50. Various other mechanisms for recharging the batteries 55 may be used, or the batteries 55 may be physically replaced as needed.

In another embodiment, the control circuit 140 is coupled to a central monitoring system, e.g., using a serial communication line to carry data over a local network. The control circuit may collect data about the operation of the server and the backup power source 50, and then report that information back to the central monitoring system. The reported information may include the reporting of times when the backup power system is invoked. The control circuit 140 may also report diagnostics about the backup power source 50, enabling system operators to determine more easily when to replace, service, or recharge the backup power source 50.

In one embodiment, the backup power source 50 is coupled to the same line as the output of the power supply 120, and the voltage from the backup power source 50 is floated, or held, just below the voltage of the power supply 120. In this way, when the voltage from the power supply 120 drops, the backup power source 50 will take over and provide power to the motherboard 110, without the need for a control circuit 140. In this embodiment, a mechanism such as a diode may be included to prevent electrical current from flowing from the power supply 120 to the backup power source 50.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A server system comprising:
   a power distribution unit coupled to receive AC electrical power;
   a plurality of motherboards, each motherboard including a plurality of electrical components, a first input, and a second input;
   a plurality of power supplies, each power supply coupled to the power distribution unit and to the first input of one or more of the motherboards, wherein each power supply is configured to receive AC electrical power from the power distribution unit and to provide DC electrical power to the motherboard;
   a backup power source configured to provide DC electrical power; and
   a plurality of DC/DC regulators, each DC/DC regulator comprising an input coupled to the backup power source and an output coupled to the second input of at least one motherboard, the DC/DC regulator coupled between the backup power source and the second input of the at least one motherboard and configured to convert DC electrical power from the backup power source to a lower voltage.

2. The system of claim 1, wherein the backup power source is thermally isolated from each of the motherboards.

3. The system of claim 1, wherein the backup power source comprises a plurality of batteries coupled in series to increase the backup power voltage.

4. The system of claim 1, wherein the backup power source comprises a plurality of batteries coupled in parallel to provide redundancy in case of a battery failure.

5. The system of claim 1, wherein the DC electrical power supplied by the backup power source is held at a voltage below the voltage of the DC electrical power provided by the power supplies.

6. The system of claim 1, further comprising:
   a site transformer coupled to receive electrical power from a utility service and coupled to provide AC electrical power to the power distribution unit, wherein the site transformer is configured to transform the electrical power received from the utility service to a lower voltage.

7. The system of claim 6, wherein the site transformer is coupled to the power distribution unit without an uninterrupted power supply (UPS).

8. The system of claim 6, further comprising:
a generator coupled between the site transformer and the power distribution unit, wherein the generator is configured to activate responsive to a failure of the electrical power from the utility service.

9. The system of claim 1, further comprising:
a plurality of control circuits, each control circuit configured to monitor the voltage of the backup power source.

10. The system of claim 9, wherein the control circuits are configured to disconnect one or more of the motherboards from the backup power source when the voltage of the backup power source is low.

11. The system of claim 9, wherein the control circuits are communicatively coupled to a central monitoring system.

12. The system of claim 1, further comprising:
a plurality of control circuits, each control circuit configured to couple the backup power source to one or more of the motherboards responsive to a failure of electrical power from the power supply associated with the motherboard.

13. The system of claim 1, further comprising:
at least one control circuit configured to couple at least one power supply to the backup power source to recharge the backup power source using AC electrical power from the power distribution unit.

14. The system of claim 1, further comprising:
an external charging system coupled to the backup power source and configured to recharge the backup power source responsive to an indication of a need to recharge the backup power source.

15. A server system comprising:
a plurality of servers, each server comprising:
  a power supply configured to convert AC electrical power to DC electrical power,
  a DC/DC regulator configured to convert DC electrical power to a lower voltage, and
  a motherboard having a plurality of electrical components, a first input coupled to the power supply and configured to receive DC electrical power from the power supply for the electrical components, and a second input coupled to an output of the DC/DC regulator and configured to receive DC electrical power from the DC/DC regulator for the electrical components; and
a plurality of conductor lines coupled to a backup power source, such that for each server, a conductor line electrically couples an input of the DC/DC regulator of the server to the backup power source, the backup power source for supplying backup DC electrical power to the plurality of servers, wherein, for each server, the DC/DC regulator of the server is coupled between the backup power source and the motherboard of the server.

16. The system of claim 15, wherein the backup power source is thermally isolated from the servers.

17. The system of claim 15, wherein the backup power source comprises a plurality of batteries coupled in series to increase the backup power voltage.

18. The system of claim 15, wherein the backup power source comprises a plurality of batteries coupled in parallel to provide redundancy in case of a battery failure.

19. The system of claim 15, wherein the DC electrical power supplied by the backup power source is held at a voltage below the voltage of the DC electrical power provided by the power supplies.

20. The system of claim 15, wherein each server comprises a control circuit configured to monitor a DC voltage on the conductor.

21. The system of claim 20, wherein each control circuit is configured to disconnect the motherboard from the conductor when the voltage on the conductor is low.

22. The system of claim 20, wherein each control circuit is communicatively coupled to a central monitoring system.

23. The system of claim 15, wherein each server comprises a control circuit configured to couple the conductor to one or more of the motherboards responsive to a failure of electrical power from the power supply associated with the motherboard.

24. A method comprising:
receiving AC electrical power at a site from a utility service;
supplying the received AC electrical power to each of a plurality of servers located at the site via a first server input;
coupling a DC backup power source to an input of each of a plurality of DC/DC regulators configured to convert DC electrical power from the DC backup power source to a lower voltage, each DC/DC regulator comprising an output coupled to a second input of one or more servers, wherein each DC/DC regulator is coupled between the DC backup power source and a server; and
upon failure of the AC electrical power from the utility service, supplying DC electrical power to the servers via the DC/DC regulators from the DC backup power source.

25. The method of claim 24, further comprising:
thermally isolating the backup power source from each of the servers.

26. The method of claim 24, further comprising:
upon failure of the AC electrical power from the utility service, activating a generator; and
after a startup period of the generator, supplying AC power from the generator to the plurality of servers located at the site.

27. The method of claim 24, further comprising:
monitoring the voltage of the DC backup power source; and
communicating the monitored voltages to a central monitoring system.

28. The method of claim 24, further comprising:
disconnecting one or more of the motherboards from the DC backup power source when the voltage of the backup power source is low.

29. The server system of claim 1, wherein the plurality of motherboards are located within one or more server racks, and wherein the backup power source is located external to the one or more server racks.

30. The server system of claim 15, wherein the plurality of servers are located within one or more server racks, and wherein the backup power source is located external to the one or more server racks.

31. The method of claim 24, wherein the plurality of servers are located within one or more server racks, and wherein the DC backup power source is located external to the one or more server racks.

32. The server system of claim 1, further comprising:
a plurality of control circuits, each control circuit configured to:
  measure the input voltage from the backup power source,
  measure the output voltage from one of the plurality of DC/DC regulators, and
  control the DC/DC regulator responsive to the measured input voltage and/or measured output voltage.

33. The server system of claim 15, wherein each server further comprises a control circuit configured to:
   measure the input voltage from the backup power source;
   measure the output voltage from the DC/DC regulator; and
   control the DC/DC regulator responsive to the measured input voltage and/or measured output voltage.

34. The method of claim 24, further comprising:
   measuring the input voltage from the DC backup power source;
   measuring the output voltage from one of the plurality of DC/DC regulators; and
   controlling the DC/DC regulator responsive to the measured input voltage and/or measured output voltage.

* * * * *